(12) United States Patent  
Okamoto (10) Patent No.: US 8,306,278 B2
(45) Date of Patent: Nov. 6, 2012

(54) DETECTING DEVICE, METHOD, PROGRAM AND SYSTEM

(75) Inventor: Takuya Okamoto, Kizukawa (JP)

(73) Assignee: OMRON Corporation, Kyoto (JP)

( * ) Notice: Subject to any disclaimer, the term of this patent is extended or adjusted under 35 U.S.C. 154(b) by 944 days.

(21) Appl. No.: 12/345,547

(22) Filed: Dec. 29, 2008

(65) Prior Publication Data

US 2009/0169068 A1 Jul. 2, 2009

(30) Foreign Application Priority Data

Dec. 28, 2007 (JP) ................................ 2007-340613

(51) Int. Cl.
*G06K 9/00* (2006.01)

(52) U.S. Cl. ............ 382/115; 382/118; 713/186; 902/3; 340/576

(58) Field of Classification Search ........................ None
See application file for complete search history.

(56) References Cited

U.S. PATENT DOCUMENTS

| 4,324,558 | A  | * | 4/1982 | Obermayer ..................... 436/85 |
| 4,843,377 | A  | * | 6/1989 | Fuller et al. ................. 340/573.4 |
| 6,173,068 | B1 | * | 1/2001 | Prokoski ....................... 382/115 |
| 6,529,617 | B1 | * | 3/2003 | Prokoski ....................... 382/128 |
| 7,175,528 | B1 | * | 2/2007 | Cumbers ......................... 463/29 |
| 7,256,700 | B1 | * | 8/2007 | Ruocco et al. ................ 340/576 |
| 2002/0084130 | A1 | * | 7/2002 | Der Ghazarian et al. ..... 180/272 |
| 2002/0136435 | A1 | * | 9/2002 | Prokoski ....................... 382/118 |
| 2003/0024633 | A1 | * | 2/2003 | Ogura et al. .................. 156/250 |
| 2003/0117287 | A1 | * | 6/2003 | Crespo ......................... 340/576 |

FOREIGN PATENT DOCUMENTS

| EP | 1591296 A1 | * | 11/2005 |
| FR | 2850909 A1 | | 8/2004 |
| GB | 2431496 A | | 4/2007 |
| JP | 2004-275783 | | 10/2004 |

OTHER PUBLICATIONS

English Abstract from esp@cenet.com for Japanese application with Publication No. 2004-275783, Publication Date: Oct. 7, 2004, 1 page.
Extended European Search Report for Application No. 08171739.9-1523, mailed on Apr. 1, 2009 (6 pages).
Chinese office Action for Application No. 200810185057.8, mailed on May 10, 2011 and English translation thereof, 9 pages.

* cited by examiner

*Primary Examiner* — John Lee
(74) *Attorney, Agent, or Firm* — Osha Liang LLP (57) ABSTRACT

In a detecting device for detecting a fake test of Blood Alcohol Concentration (BAC) that another testee different from an actual driver takes on behalf of the actual driver of a vehicle using an alcohol measurement device, the face image of the testee taking the BAC test is shot during measurement of the BAC and the face image of the driver of the vehicle is shot within a predetermined period of time before or after the measurement of the BAC. The testee and the driver are checked whether they are the same person based on the face images of the testee and the driver.

7 Claims, 6 Drawing Sheets

DETECTING DEVICE, METHOD, PROGRAM AND SYSTEM

BACKGROUND OF THE INVENTION

1. Field of the Invention

The present invention relates to a detecting device, method, program and system, and more particularly, relates to a detecting device, method, program and system for detecting a fake test of blood alcohol concentration (BAC) that another testee different from an actual driver takes on behalf of the actual driver.

2. Description of Related Art

It is conventionally proposed to take a driver's picture after the driver's authentication, when it is in a predetermined time, or when a driver's seat switch is switched on, an ignition switch turns on or a driver's seat belt switch is switched on following opening and closing of a vehicle door, and check the picture with a preregistered face image in order to detect a fake authentication of a driver. (see Japanese laid open patent publication 2004-275783)

SUMMARY

In recent years many serious traffic accidents due to drunk driving is growing and becoming a social problem. Severe penalties are sought on drunk driving, however these penalties are hardly ultimate solutions because the problem eventually depends on the matter of a driver's moral.

An alcohol interlock system, therefore is getting widely used these days. It prevents a vehicle from driving by locking an ignition switch when a blood alcohol concentration (BAC) is detected at a certain level or higher through a driver's test of the BAC using an alcohol sensor. On the other hand, it is desired to prevent another person different from an actual driver from taking the test of the BAC in the alcohol interlock system.

However, there is no consideration in the Japanese publication for removing a fake breath test of BAC that another person different from an actual driver takes on behalf of the actual driver.

One or more embodiments of the present invention securely removes the fake test of BAC that another testee different from an actual driver takes on behalf of the actual driver.

According to a detecting device of an aspect of the present invention, a fake test detecting device for detecting that another testee different from an actual driver takes a test of BAC, comprises: a testee face image pick-up means for picking up a face image of a testee during a test of BAC required for driving a vehicle; a driver face image pick-up means for picking up a driver face image shot within a predetermined period of time before or after the test of BAC; and a checking means for checking the testee and the driver based on the face images of the testee and the driver.

According to a detecting method of an aspect of the present invention, a fake test detecting method for detecting that another testee different from an actual driver takes a test of BAC, comprises: a step of picking up a face image of a testee during a test of BAC; a step of picking up a driver face image shot within a predetermined period of time before and after the test of BAC; and a step of checking the testee and the driver based on the face images of the testee and the driver.

In this way, the fake test that another testee different from an actual driver takes can be securely removed.

The testee face image pick-up means, the driver face image pick-up means, and the checking means are configured, for example, with a CPU (Central Processing Unit) or ECU (Electronic Control Unit).

A vehicle control means for limiting driving a vehicle if the testee and the driver do not coincide may be further provided.

In this way, a driver can be securely prevented from driving without taking a test of BAC.

The vehicle control means is configured, for example, with CPU or ECU.

The alcohol measuring device displays a predetermined change in its appearance during measuring the BAC. The appearance change is shot together with the face image of the testee during the measurement. A measuring judging means may be further provided for judging whether the measurement of the BAC is properly performed based on the appearance change of the alcohol measuring device appearing in the face image of the testee.

In this way, the alcohol measuring device the testee uses to measure the BAC can be identified as an authentic device. Thus, a fake measurement in which the driver is shot using a fake device, while another person different from the driver undergoes the BAC measurement using the authentic device as not to be shot can be prevented.

The measuring judging means is configured, for example, with CPU or ECU.

A vehicle control means may be further provided for limiting driving a vehicle if it is judged that a testee and a driver do not coincide or the test of BAC is not properly performed.

In this way, a driver can be securely prevented from driving a vehicle without taking the test of BAC.

The vehicle control means may be configured, for example, with CPU or ECU.

The checking means may pick up the face images of the driver shot at given timings, so that it may repeat to check the testee and the driver based on the face images of the testee and a newly picked-up face image of the driver.

In this way, the fake test of BAC that another testee different from an actual a driver takes is securely prevented.

A seat-leaving detecting means for detecting a driver leaving a seat and a vehicle control means for limiting and releasing driving a vehicle may be further provided. The vehicle control means limits driving a vehicle when detecting a driver leaving a seat and judging that a testee and a driver do not coincide, while it releases driving a vehicle when judging that the testee and the driver coincide and the measured BAC is blow a certain level.

In this way, a driver can be securely prevented from driving a vehicle without taking the test of BAC.

The seat-leaving detecting means and the vehicle control means are configured, for example, with CPU or ECU.

According to a detecting method of an aspect of the present invention, a detecting method for detecting that another testee different from an actual driver takes a test of BAC required for a vehicle driving on behalf of the actual driver, comprises: a step of picking up a face image of a testee shot during the test of BAC; a step of picking up a driver face image shot within a predetermined period of time before or after the test of BAC; and a step of checking the testee and the driver based on the face images of the testee and the driver.

The steps of picking up the testee face image shot during the test of BAC, picking up the driver face image shot within a predetermined period of time before or after the test of BAC, and checking the testee and the driver based on the face images of the testee and the driver are executed, for example, by a CPU.

Therefore, a fake test of BAC that another testee different from an actual driver takes can be securely removed.

DETAILED DESCRIPTION

In the following detailed description, reference is made to the accompanying FIGS. 1 through 6, which illustrate the described embodiments. The embodiments are described in sufficient detail to enable those skilled in the art to make and use them.

Figure 1:
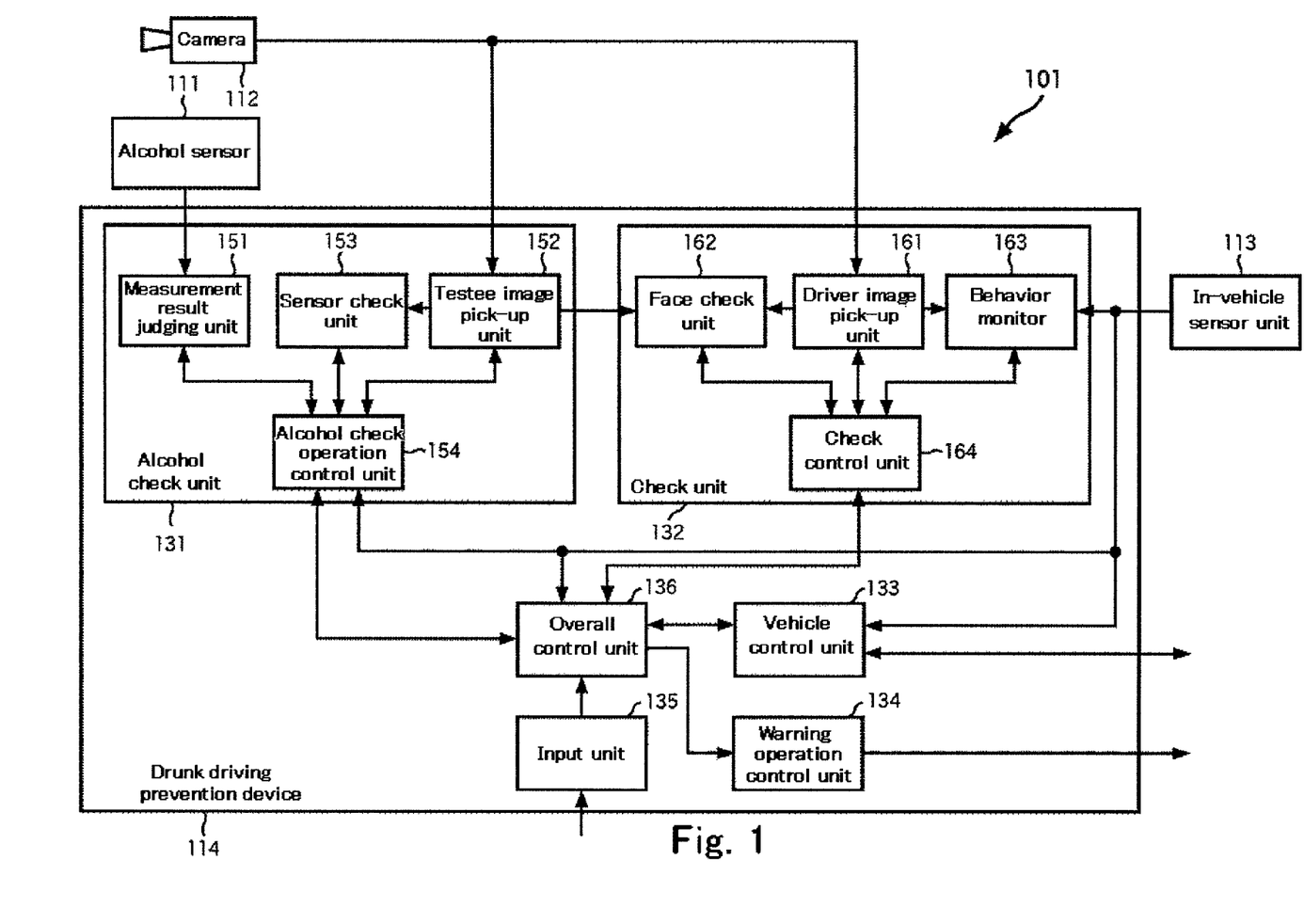
FIG. 1 is a block diagram showing an embodiment of a drunk driving prevention system according to one or more embodiments of the present invention.

FIG. 1 is a block diagram showing an embodiment of a drunk driving prevention system according to one or more embodiments of the present invention. The drunk driving prevention system 101 in FIG. 1 is configured to include alcohol sensor 111, camera 112, in-vehicle sensor unit 113, and drunk driving prevention device 114.

Figure 2:
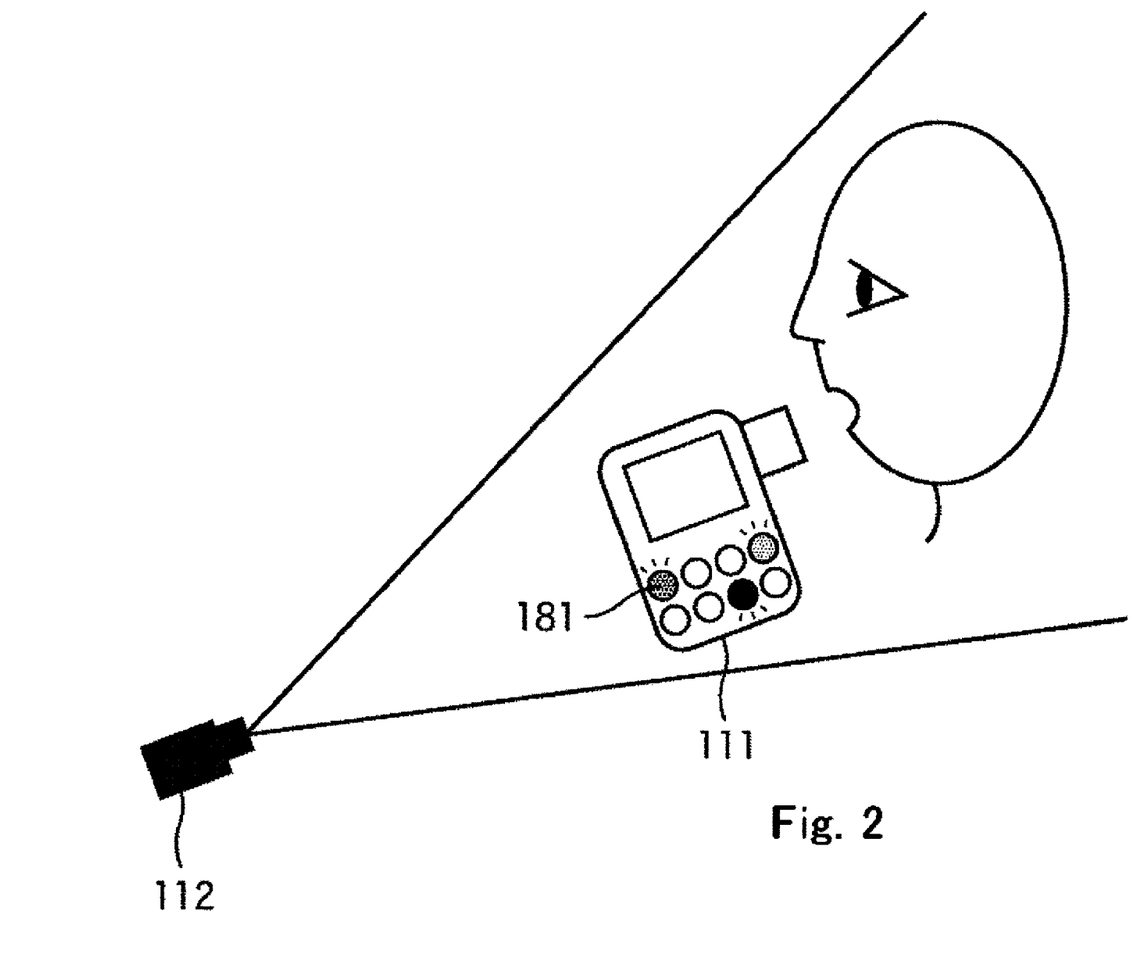
FIG. 2 is a view of illustrating the way to confirm a valid breath test of blood alcohol concentration (BAC).

Alcohol sensor 111 is a sensor for measuring blood alcohol concentration (BAC) of a man's breath and supplies a signal of the measured BAC to measurement result judging unit 151 of drunk driving prevention device 114. As shown in FIG. 2, LED 181 is provided on the outer surface of alcohol sensor 111. LED 181 is preset so as to blink in a predetermined pattern when a person undergoing a BAC check (a testee of breath test) blows alcohol sensor 111.

Camera 112 is arranged to shoot a full face of a person in a driver's seat of a vehicle equipped with drunk driving prevention device 114 (hereinafter referred to as a self-vehicle). Thus, it is possible to shoot the face of a testee undergoing the BAC check using alcohol sensor 111 in the driver's seat and the face of a driver driving the self-vehicle. Camera 112 supplies an image including the shot face (hereinafter referred to as a face image) to testee image pick-up unit 152 and driver image pick-up unit 161 of drunk driving prevention device 114.

In-vehicle sensor unit 113 is configured with various types of sensors equipped with the self-vehicle, such as vehicle-speed sensor, yaw rate sensor, seat sensor, etc. In-vehicle sensor unit 113 supplies signals outputted from the various types of sensors to vehicle control unit 133, overall control unit 136, alcohol-check-operation control unit 154, and behavior monitor 163 of drunk driving prevention device 114.

Drunk driving prevention device 114 is configured with ECU (Electronic Control Unit) which executes predetermined programs and controls driving of the self-vehicle responding to driver's BAC (Blood Alcohol Concentration). Drunk driving prevention device 114 includes alcohol check unit 131, check unit 132, vehicle control unit 133, warning-operation control unit 134, input unit 135, and overall control unit 136.

Alcohol check unit 131 judges whether an alcohol check is performed properly, and judges whether the measured BAC is at a certain level or above when the alcohol check is performed properly. Alcohol check unit 131 includes measurement-result judging unit 151, testee image pick-up unit 152, sensor check unit 153, and alcohol-check-operation control unit 154.

Measurement-result judging unit 151 is controlled by alcohol-check-operation control unit 154 so as to judge whether the BAC of a breath measured by alcohol sensor 111 is at a certain level or higher. The certain level is set at the level of the BAC regulated by law and applied for judging drunk driving. Measurement-result judging unit 151 supplies the measurement result to alcohol-check-operation control unit 154.

Testee image pick-up unit 152 is controlled by alcohol-check-operation control unit 154 so as to pick up a face image of a testee (hereinafter referred to as a testee image) undergoing an alcohol check from camera 112, and supplies the testee image to sensor check unit 153 and face check unit 162.

Sensor check unit 153 judges whether the alcohol check is performed properly depending on whether LED 181 on alcohol sensor 111 blinks in a predetermine pattern which appears in the testee image. Sensor check unit 153 supplies the judgment result to alcohol-check-operation control unit 154.

Alcohol-check-operation control unit 154 is controlled by overall control unit 136 so as to control the respective units of alcohol check unit 131. Further, alcohol-check-operation control unit 154 supplies the information outputted from the respective units of alcohol check unit 131 to overall control unit 136 and supplies the information from overall control unit 136 to the respective units of alcohol check unit 131.

Check unit 132 detects a fake alcohol check that another person different from an actual driver undergoes on behalf of the actual driver. Check unit 132 includes driver image pick-up unit 161, face check unit 162, behavior monitor 163, and check control unit 164.

Driver image pick-up unit 161 is controlled by check control unit 164 so as to pick up a face image of a driver driving the self-vehicle (hereinafter referred to as a driver image) from camera 112 and supplies the driver image to face check unit 162 and behavior monitor 163.

Face check unit 162 is controlled by check control unit 164 so as to check the testee and the driver based on the testee image and the driver image. Face check unit 162 supplies the check result to check control unit 164.

Behavior monitor 163 is controlled by check control unit 164 so as to monitor the behavior of a driver by the driver image and various types of sensor signals supplied from sensor unit 113. Behavior monitor 163 supplies the monitoring information to check control unit 164.

Check control unit 164 is controlled by overall control unit 136 so as to control the operation of the respective units included in check unit 132. Check control unit 164 supplies the information from the respective units to overall control unit 136 and supplies the information from overall control unit 136 to the respective units of check unit 132.

Vehicle control unit 133 is controlled by overall control unit 136 so as to control the self-vehicle driving by controlling other ECUs, an engine control unit, and various types of in-vehicle components. Further, vehicle control unit 133 limits the self-vehicle driving based on the alcohol check result, the check result of a testee and a driver, and the behavior of the driver as described later referring to FIGS. 3 to 5.

Warning-operation control unit 134 is controlled by overall control unit 136 so as to issue a warning for the driver and around the self-vehicle using a monitor, speaker, light-emitting device, etc. in the self-vehicle. Further, warning-operation control unit 134 reports the suspicious behavior of the driver to the police, insurance companies, etc. as necessary via a communication device in the self-vehicle (not shown).

Input unit 135 is configured with a switch, button, keyboard, etc. which are used for entering various types of commands into drunk driving prevention device 114. Input unit 135 supplies the commands entered by a user to overall control unit 136.

Overall control unit 136 controls the operation of the respective units included in drunk driving prevention device 114.

Figure 3:
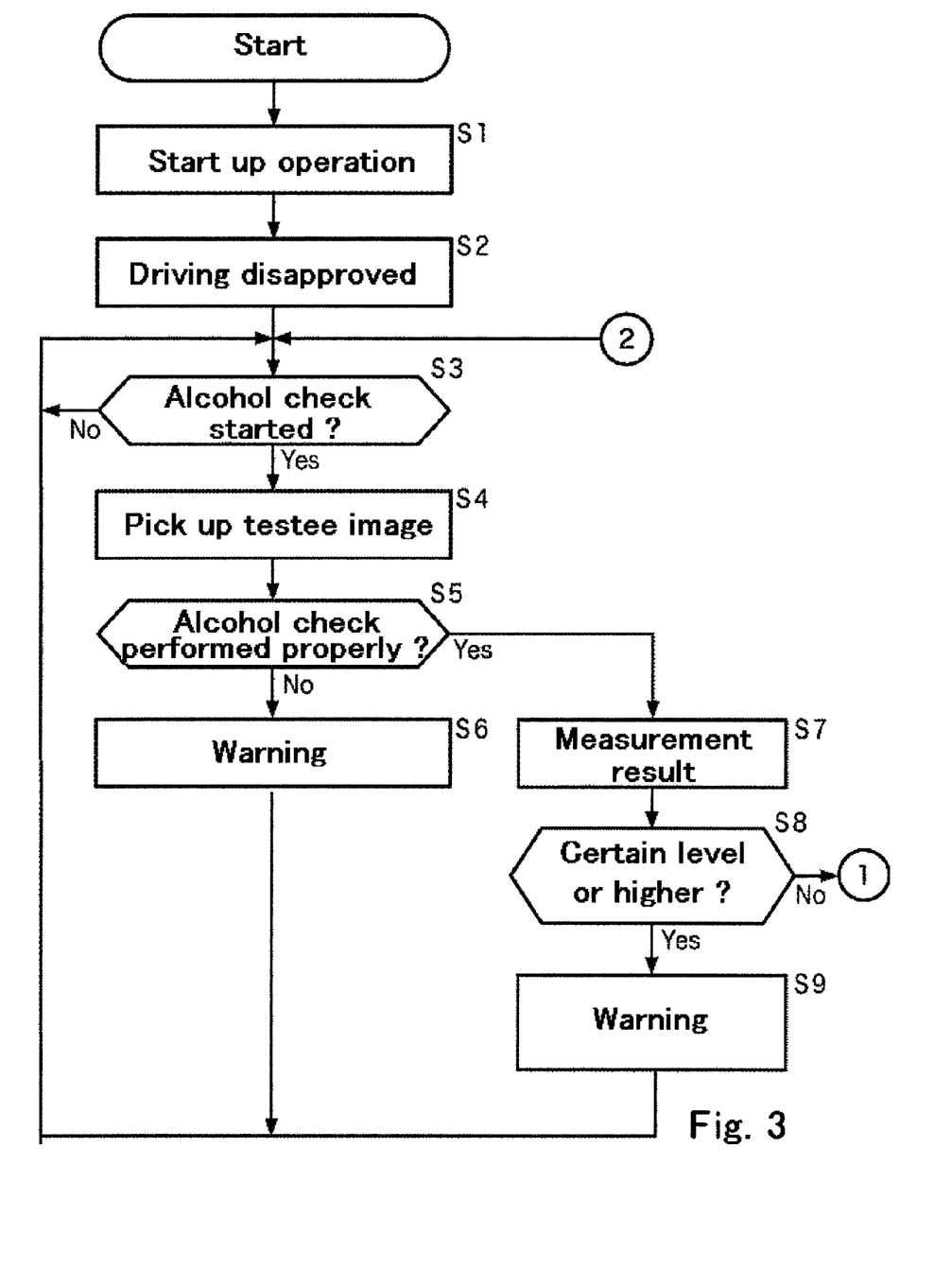
FIG. 3 is a flowchart illustrating the prevention processes of drunk driving.
Figure 4:
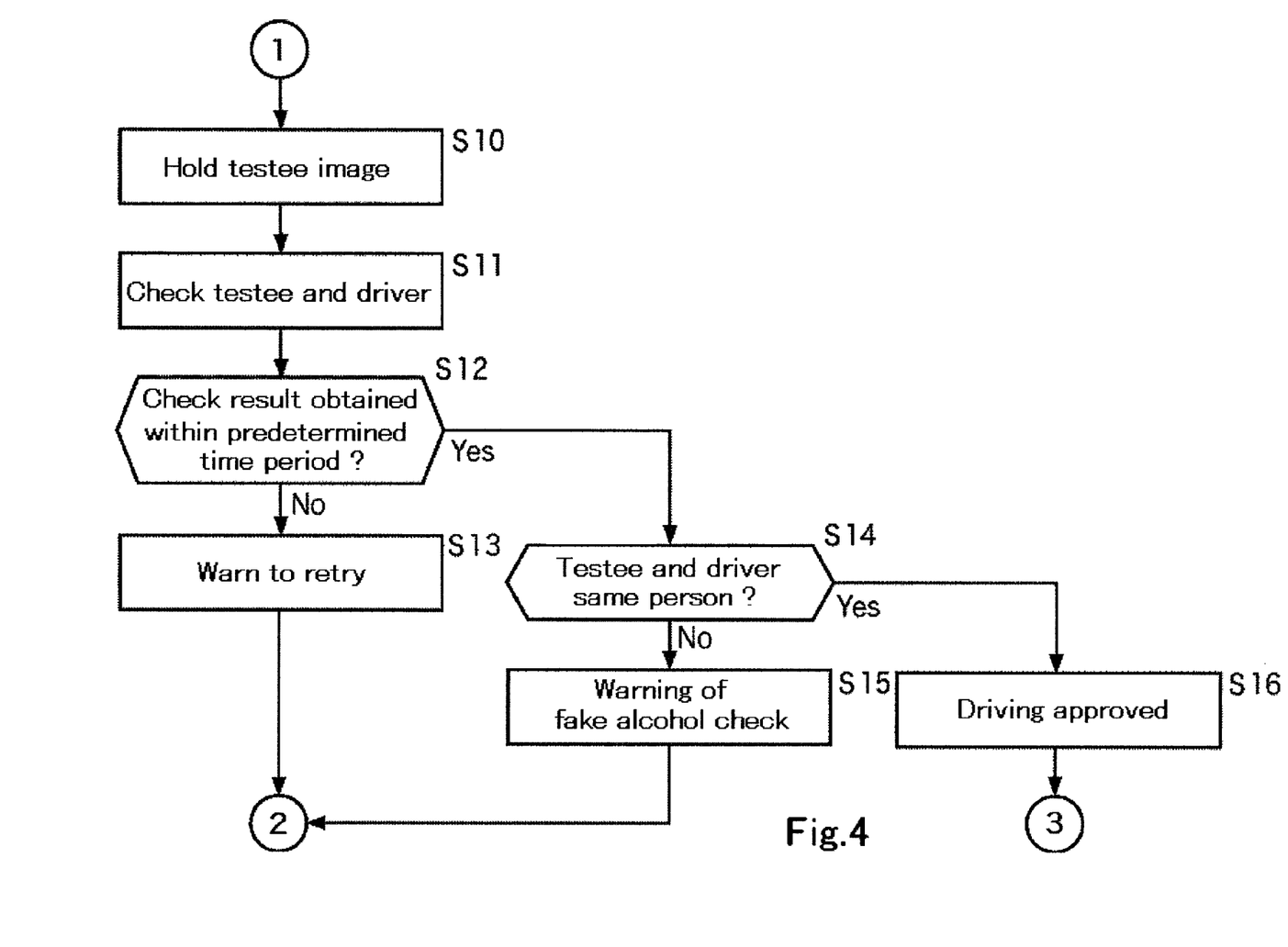
FIG. 4 is a flowchart illustrating the prevention processes of drunk driving.
Figure 5:
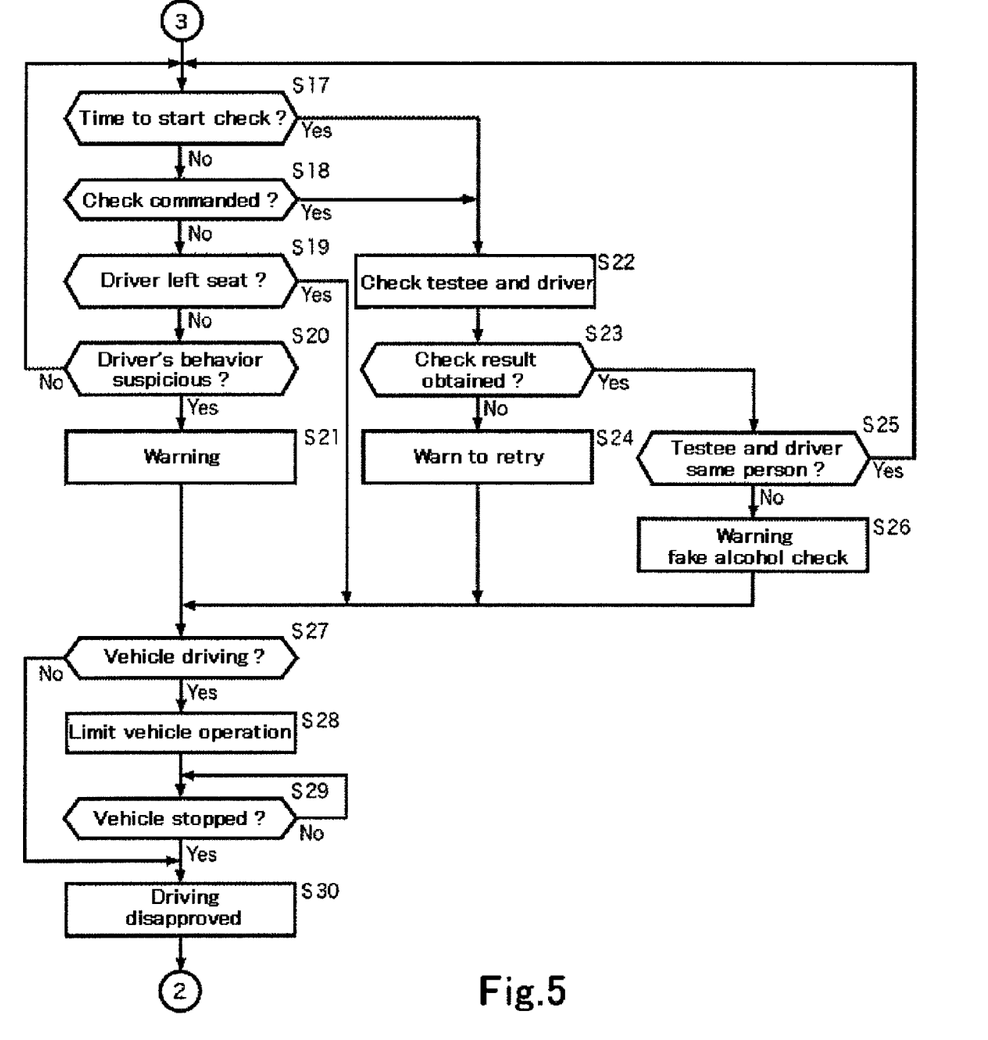
FIG. 5 is a flowchart illustrating the prevention processes of drunk driving.

Next, drunk driving prevention processes executed by drunk driving prevention system 101 are described referring to flowcharts shown in FIGS. 3 to 5. The process is started, for example, when a start command is entered in drunk driving prevention system 101 via input unit 135.

In Step S1, drunk driving prevention system 101 activates start-up operation. Specifically, overall control unit 136 activates respective units of drunk driving prevention device 114, performs initial setting, and start operations. Camera 112 starts shooting and supplying shot images to driver image pick-up unit 161.

In Step S2, vehicle control unit 133 set the self-vehicle in the driving disapproved mode. Vehicle control unit 133 limits driving of the self-vehicle, for example by locking a parking brake so as not to be released, locking a shift lever to disable gear change, or locking an ignition switch so as not to rotate and start an engine.

In Step S3, measurement result judging unit 151 judges the start of an alcohol check. Step S3 is repeatedly processed until the start of the alcohol check is judged. Measurement result judging unit 151 judges the start of alcohol check and the process goes to Step S4 when a signal showing the start of the alcohol check is supplied from alcohol sensor 111, for example, by switching on the power switch or other predetermined switch or button of alcohol sensor 111.

In Step S4, testee image pick-up unit 152 picks up testee images. Specifically, testee image pick-up unit 152, as shown in the FIG. 2, picks up in series from camera 112 the testee images shot during an alcohol check using alcohol sensor 111 and supplies the testee images to sensor check unit 153.

In Step S5, sensor check unit 153 judges whether the alcohol check was performed properly. As described above, LED 181 of alcohol sensor 111 blinks in a predetermined pattern when a person blows the alcohol sensor. Sensor check unit 153, when it could not confirm the LED 181 blinked in the predetermined pattern within a predetermined period of time based on the testee images, judges that the alcohol check was not performed properly, then the process goes to Step S6.

In Step S6, warning-operation control unit 134 issues a warning that the alcohol check was not performed properly. Specifically, sensor check unit 153 supplies a signal showing that the alcohol check was not performed properly to vehicle control unit 133 and warning-operation control unit 134 via alcohol-check-operation control unit 154 and overall control unit 136. Warning-operation control unit 134 issues a warning to a driver to perform the alcohol check properly by, for example, outputting a warning sound or message from an in-vehicle speaker (not shown), displaying a warning message on a monitor in the self-vehicle (not shown), or lighting or blinking a light emitting device in the self-vehicle (not shown). Further, warning-operation control unit 134 reports to the police or insurance companies that a driver of the self-vehicle did not perform the alcohol check properly.

In this way, a fake alcohol check in which the driver is shot by camera 112 using a fake alcohol sensor, while another person different from the driver undergoes the actual alcohol check using the authentic alcohol sensor 111 as not to be shot by camera 112 is prevented.

After that, the process goes back to Step S3, and the processes after Step S3 are executed.

On the other hand, in Step S5, sensor check unit 153, if it could confirm based on the testee images that LED 181 of alcohol sensor 111 blinked in the predetermined pattern within the predetermined period of time, judges that the alcohol check was performed properly, then the process goes to Step S7.

In Step S7, measurement result judging unit 151 picks up a measurement result of BAC from alcohol sensor 111.

In Step S8, measurement result judging unit 151 judges whether the BAC is a certain level or higher based on the picked up measurement result. If the BAC is judged as the certain level or above, the process goes to Step S9.

In Step S9, warning-operation control unit 134 issues a warning that the BAC is the certain level or higher. Specifically, measurement result judging unit 151 supplies the information showing that the BAC is the certain level or higher to vehicle control unit 133 and warning-operation control unit 134 via alcohol-check-operation control unit 154 and overall control unit 136. Warning-operation control unit 134 issues a warning to a driver that the BAC is the certain level or higher by, for example, outputting a warning sound or message from an in-vehicle speaker (not shown), displaying a warning message on a monitor in the self-vehicle (not shown), or lighting or blinking a light emitting device in the self-vehicle (not shown). Further, warning-operation control unit 134 reports to the police or insurance companies that the BAC of a driver of the self-vehicle is at the certain level or higher.

After that, the process goes back to Step S3, and the processes after Step S3 are executed.

On the other hand, in Step S8, if the BAC is judged as lower than the certain level the process goes to Step S10.

In Step S10, face check unit 162 holds the testee image. Specifically, testee image pick-up unit 152 supplies the testee image picked up in Step S4 to face check unit 162. Face check unit 162 holds the picked-up testee image and cancels the old testee image if any. It does not have to hold all the testee images picked up during the alcohol check. Only the testee image fitted for checking faces may be held.

In Step S11, face check unit 162 checks the testee and the driver. Specifically face check unit 162 picks up via driver image pick-up unit 161 the driver images in the driver's seat of the self-vehicle shot by camera 112. Face check unit 162 checks based on a specific technique the testee face appearing in the testee image and the driver face appearing in the driver images to judge whether the testee and the driver are the same person. Face check unit 162 continues to pick up the driver images until it obtains the check result or a predetermine time goes by and repeats to check the testee and the driver based on the testee image and picked up driver images.

Following the alcohol check, the first check of the testee and the driver is performed, for example, at the times when the driver's operations to start driving, such as gripping a steering wheel, rotating a ignition switch to start a engine, etc. are detected in a predetermined time after the alcohol check.

The checking technique used by face check unit 162 is not limited to the specific one. A technique that can check person's faces promptly, accurately, and simply is preferably applied.

In Step S12, face check unit 162 judges whether a check result was obtained within a predetermine period of time after the alcohol check. If face check unit 162 judges that the check result was not obtained within a predetermined period of time after the alcohol check because, for example, the face of the driver could not be detected from the driver images, the process goes to Step S13.

In Step S13, warning-operation control unit 134 operates to warn the driver to retry the alcohol check. Specifically, check control unit 164 supplies the information showing that the check result could not be obtained to vehicle control unit 133 and warning-operation control unit 134 via overall control unit 136. Warning-operation control unit 134 operates to warn the driver to retry the alcohol check by, for example, outputting a warning sound or message from an in-vehicle speaker (not shown), displaying a warning message on a monitor in the self-vehicle (not shown), or lighting or blinking a light emitting device in the self-vehicle (not shown).

After that, the process goes back to Step S3 and processes after Step S3 are executed. In this way, if the check result could not be obtained within a predetermined time, the process prevents the driver from driving the self-vehicle.

On the other hand, in Step S12, if face check unit 162 judges that the check result was obtained within a predetermine time, then the process goes to Step S14.

In Step S14, face check unit 162 judges whether the testee and the driver are the same person based on the check result of Step S11. If face check unit 162 judges that they are not the same person, then the process goes to Step S15.

In Step S15, warning-operation control unit 134 issues a warning against the fake alcohol check. Specifically, face check unit 162 supplies the information showing that the testee and the driver are not the same person to vehicle control unit 133 and warning-operation control unit 134 via check control unit 164 and overall control unit 136. Warning-operation control unit 134 warns the driver to stop driving by for example, outputting a warning sound or message from an in-vehicle speaker (not shown), displaying a warning message on a monitor in the self-vehicle (not shown), or lighting or blinking a light emitting device in the self-vehicle (not shown). Further, warning-operation control unit 134 reports to the police or insurance companies that the fake alcohol check was performed by the driver driving the self-vehicle.

After that, the process goes back to Step S3 and the processes after Step S3 are executed as described above.

On the other hand, in Step S14, if the testee and the driver are judged as the same person, in other words, if it is judged that the driver himself underwent the alcohol check and the BAC of the driver is lower than the certain level, the process goes to Step S16.

In Step S16, vehicle control 133 set the self-vehicle in the driving approved mode. Specifically, face check unit 162 supplies the information showing that the judging result of the alcohol check is normal to vehicle control unit 133 via check control unit 164 and overall control unit 136. Vehicle control unit 133 set the self-vehicle in the driving approved mode that allows the vehicle to drive as usual.

In Step S17, check control unit 164 judges whether it is a time to start a check. If it is judged that it is not the time, then the process goes to Step S18.

In Step S18, check control unit 164 judges whether the check was commanded. If it is judged that the check was not commanded, then the process goes to Step S19.

In Step S19, behavior monitor 163 judges whether the driver left the seat. If behavior monitor 163 judges that the driver did not leave the seat based on the driver images picked up from camera 112 through driver image pick-up unit 161, the signal showing whether the driver is seated in the driver's seat outputted from in-vehicle sensor unit 113, and the signal showing opening and closing the driver's door, then the process goes to Step S20.

In Step S20, behavior monitor 163 judges whether the driver's behavior is suspicious. If behavior monitor 163 judges that the driver's behavior is normal based on the driver images picked up from camera 112 through driver image pick-up unit 161, and various types of sensor signals outputted from in-vehicle sensor unit 113, then the process goes back to Step S17. Steps S17 through S20 are repeatedly executed until it is judged that it is a time to start to check in Step S17, that a check was commanded in Step S18, that the driver left the seat in Step S19, or that the driver's behavior is suspicious in Step S20.

On the other hand, in Step S20, when behavior monitor 163 detects that the driver's face looks drunk, that the self-vehicle snakes its way, and that applying a brake is delayed, based on the face images from camera 112 and various types of detecting signals from in-vehicle sensor 113, it judges that the driver's behavior is suspicious and supplies the information showing that the driver's behavior is suspicious to vehicle control unit 133 and warning-operation control unit 134 via check control unit 164 and overall control unit 136. After that the process goes to Step S21.

In Step S21, warning-operation control unit 134 issues warnings against the suspicious behaviors. Specifically, warning-operation control unit 134 warns the driver to stop driving by, for example, outputting a warning sound or message from an in-vehicle speaker (not shown), displaying a warning message on a monitor in the self-vehicle (not shown), or lighting or blinking a light emitting device in the self-vehicle (not shown). Then the process goes to Step S27 and driving the self-vehicle is limited until the driver himself undergoes the alcohol check and the BAC of the driver is judged as below the certain level.

On the other hand, in Step S19, when behavior monitor 163 judges that the driver left the seat, it supplies the information showing that the driver left the seat to vehicle control unit 133 and warning-operation control unit 134 via overall control unit 136. After that, the process goes to Step S27. In other words, the present measurement result of the BAC is canceled because the driver left the seat and the self-vehicle driving is limited as described later until the driver himself undergoes the alcohol check and the BAC is judged as below the certain level.

Further in Step S18, check control unit 164 judges that check was commanded when a command of checking the testee and the driver was inputted from input unit 135 or overall control unit 136, then the process goes to Step S22.

Further in Step S17, if it is judged that it is a time to perform a check, the process goes to Step S22. The check may be performed at specified time intervals or every time when the vehicle drives a certain miles.

In Step S22, the testee and the driver are checked as in the Step S11.

In Step S23, face check unit 162 judges whether a check result was obtained within a predetermined period of time. If face check unit 162 judges that the check result was not obtained within the predetermined period of time due to the failure of detecting the driver's face from the driver image, then the process goes to Step S24.

In Step S24, a retry of the alcohol check is prompted and the process goes to Step S27.

Accordingly, for example, if the testee was replaced by the driver and the driver hid his face from camera 112 or covered his face with a ski mask or the like, the self-vehicle is limited to drive until the driver himself undergoes the alcohol check and the BAC of the driver is judged as below the certain level.

On the other hand, in Step S23, if it is judged that the check result was obtained within the predetermined period of time the process goes to Step S25. In Step S25, as in the Step S14, it is judged whether the testee and the driver are the same person. If it is judged that the testee and the driver are the same person, then the process goes back to Step S17 and the processes after Step S17 are executed as described above.

On the other hand, in Step S25, if it is judged that the testee and the driver are not the same person, the process goes to Step S26 and as in the Step S15, a warning is issued against the fake alcohol check and the process goes to Step S27.

In Step S26, warning-operation control unit 134, if the self-vehicle is driving, notifies to the outside of the self-vehicle that the driver did not undergo the alcohol check due to the fake alcohol check, by outputting a warning sound or message outward from an external speaker (not shown), or lighting or blinking a light emitting device outside the self-vehicle (not shown).

In this way, the testee is repeatedly confirmed whether he is actually driving the self-vehicle, thus it is prevented that another person replaces the testee to drive the self-vehicle.

In Step S27, vehicle control unit 133 judges whether the self-vehicle is driving based on the signal showing the speed of the self-vehicle from in-vehicle sensor unit 113. If it is judged that the self-vehicle is driving, then the process goes to Step S28.

In Step S28, vehicle control unit 133 limits the operation of the self-vehicle. For example, vehicle control unit 133 limits the speed of the self-vehicle to a certain level or below and blinks a hazard light.

In Step S29, vehicle control unit 133 judges whether the self-vehicle stopped based on the signal showing the speed of the self-vehicle from in-vehicle sensor unit 113. The judgment process of Step S29 is repeated until it is judged that the self-vehicle stopped, and when it is so judged the process goes to Step S30.

On the other hand, in Step S27, if it is judged that the self-vehicle is not driving, the processes of Steps S28 and S29 are skipped and the process goes to Step S30.

In Step S30, as in the process of Step S2, the self-vehicle is set in the driving disapproved mode. Then, the process goes back to Step S3 and processes after Step S3 are executed. Specifically, the driving of the self-vehicle is limited until that the driver himself undergoes the alcohol check and the BAC of the driver is judged below the certain level.

In this way, the fake alcohol check that another person undergoes on behalf of the actual driver is securely prevented and drunk driving is removed.

In the description above, an example of LED 181 of alcohol sensor 111 blinking in a specific pattern was used to judge whether the alcohol check is properly performed. A specific change in the appearance of alcohol sensor 111 may be represented by other manners such as changes in shape and color of alcohol sensor 111, displays of letters and images, etc. when the testee blows alcohol sensor 111, and whether the alcohol check was performed properly may be judged from such appearance changes.

In addition, sensor check unit 153 can more securely remove the fake alcohol check by controlling the changing pattern in the appearance of alcohol sensor 111. Specifically, sensor check unit 153 changes the changing pattern in every alcohol check and judges whether the appearance changes according to the changing pattern. Thus, a fake alcohol check using a fake alcohol sensor with a fixed changing pattern in the appearance can be removed.

In the above description, the first check is performed based on the testee image shot in an alcohol check and the driver images shot in a predetermined time after the alcohol check. On the contrary, the first check may be performed based on the driver image shot before the alcohol check and the testee image shot during a compulsory alcohol check performed in a predetermined period of time after shooting the driver image. In this case, if the compulsory alcohol check is not performed in the predetermined period of time after shooting the driver image, the process is required to start with shooting the image of the driver.

Furthermore, the check may be performed based on the driver image shot in a predetermined period of time before or after the alcohol check and the testee image shot during the alcohol check without fixing the order of the alcohol check and the shooting of the driver image.

One or more embodiments of the present invention can be applied to other BAC measurements performing a blood test, but not using a breath test. In this case, the instrument of the blood test and the face of the testee must appear in the same image shot during the alcohol check.

A series of the processes described above can be executed by either hardware or software. In the case when executing the series of processes by software, the programs configuring the software are installed via program recording media in a computer built in an exclusive use hardware, or in a computer capable of executing various types of functions by installing various types of programs, for example, a multiple purpose personal computer.

Figure 6:
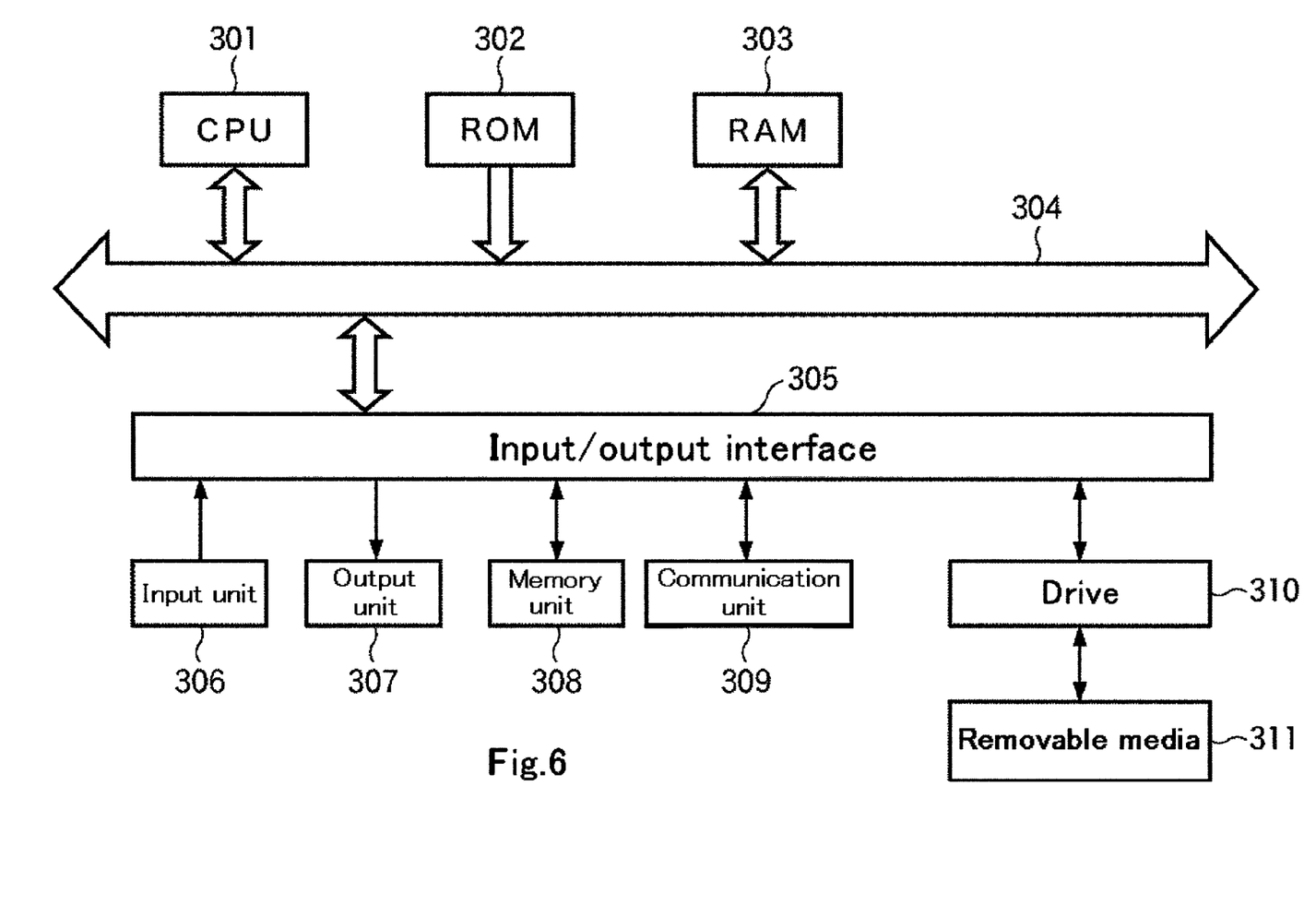
FIG. 6 is a block diagram showing an example of computer architecture.

FIG. 6 is a block diagram showing the architecture of a computer hardware for executing the program for the series of processes described above.

CPU (Central Processing Unit) 301, ROM (Read Only Memory) 302, and RAM (Random Access Memory) 303 are mutually connected by bus 304.

Bus 304 is further connected by input/output interface 305. Input/output interface 305 is connected by input unit 306 configured with a keyboard, mouse, microphone, etc., output unit 307 configured with a display, a speaker, etc., memory unit 308 configured with a hard disc, a non-volatile memory, etc., communication unit 309 configured with a network interface etc., and drive 310 for driving removable media 311 such as a magnetic disc, a photo disc, a photo-magnetic disc, or a semiconductor memory.

In the architecture described above, CPU 301 executes the program stored in memory unit 308 by loading it to RAM 303 via input/output interface 305 and bus 304, thus the series of processes are executed.

The program executed by a computer (CPU 301) is provided in the form of a package media or removable media 311 configured with a magnetic disc (flexible disc included), a photo disc (CD-ROM (Compact Disk-Read Only Memory), DVD (Digital Versatile Disc), etc.), a photo-magnetic disc, or a semiconductor memory, etc., or via wired or wireless transmission media such as a local area network, an internet, a digital satellite broadcasting, etc.

Then, the program can be installed in memory unit 308 via input/output interface 305 by attaching removable media 311 to drive 310. Alternatively, the program can be received at communication unit 309 via the wired or wireless transmission media and installed in memory unit 308. In addition, the program may be preset in ROM 302 or memory unit 308.

The program may be executed in time series described in the above embodiment, in parallel, or at an every necessary time when a calling is made.

The term of system used in the above description is to imply an overall apparatus configured with a plurality of devices, means, etc.

In the above description and drawings are only to be illustrative of exemplary embodiments which achieve the aspects and advantages described above. Modifications of, and substitutions to, specific operating conditions and structures can be made without departing from the spirit and scope of the invention.

Accordingly, the claimed invention is not to be considered as being limited by the foregoing description and drawings, but is only limited by the scope of the appended claims.

What is claimed is:

1. A detecting device for detecting a fake test of Blood Alcohol Concentration (BAC) that a person different from driver of a vehicle takes on behalf of the driver using an alcohol measurement device, comprising:
   a testee image pick-up means for picking up a face image of a testee shot during an alcohol measurement;
   a driver image pick-up means for picking up a face image of the driver shot within a predetermined period of time before or after the alcohol measurement; and
   a checking means for checking the testee and the driver based on the face images of the testee and the driver,
   wherein the alcohol measurement device displays a predetermined change in an appearance thereof during the alcohol measurement, the appearance change being shot together with the face of the testee,
   wherein the detecting device further comprises a measurement judging means for judging whether the alcohol measurement is performed properly based on the appearance change of the alcohol measurement device appearing in the face image of the testee, and
   wherein the detecting device further comprises:
      a seat-leaving monitoring means for monitoring whether the driver leaves the driver's seat of the vehicle; and
      a vehicle control means for limiting driving the vehicle when it is judged that the testee and the driver do not coincide or the driver left the driver's seat of the vehicle, and releasing driving the vehicle when it is judged that the testee and the driver coincide and the measured BAC is below a certain level.

2. The detecting device according to claim 1, further comprising:
   a vehicle control means for limiting driving the vehicle when the testee and the driver do not coincide.

3. The detecting device according to claim 1, further comprising:
   a vehicle control means for limiting driving the vehicle when the measurement judging means judges that the alcohol measurement is not performed properly.

4. The detecting device according to claim 1:
   wherein the checking means picks up the face images of the driver shot at given timings and repeats to check the testee and the driver based on the face image of the testee and the newly picked up face image of the driver.

5. A detecting method for detecting a fake test of Blood Alcohol Concentration (BAC) that a person different from driver of a vehicle takes on behalf of the driver using an alcohol measurement device, the method comprising:
   picking up a face image of the testee shot during the alcohol measurement;
   picking up a face image of the driver within a predetermined period of time before or after the alcohol measurement; and
   checking the testee and the driver based on the face images of the testee and the driver,
   wherein the alcohol measurement device displays a predetermined change in an appearance thereof during the alcohol measurement, the appearance change being shot together with the face of the testee,
   wherein the detecting device further comprises a measurement judging means for judging whether the alcohol measurement is performed properly based on the appearance change of the alcohol measurement device appearing in the face image of the testee, and
   wherein the detecting method further comprises:
      monitoring whether the driver leaves the driver's seat of the vehicle; and
      limiting driving the vehicle when it is judged that the testee and the driver do not coincide or the driver left the driver's seat of the vehicle, and releasing driving the vehicle when it is judged that the testee and the driver coincide and the measured BAC is below a certain level.

6. A computer program stored on a non-transitory medium comprising instructions for executing all the steps of the method according to claim 5, when the computer program is executed on a computer.

7. A detecting system for detecting a fake test of Blood Alcohol Concentration (BAC) that a person different from driver of a vehicle takes on behalf of the driver, comprising:
   an alcohol measurement device for measuring the BAC;
   a camera for taking pictures of a testee undergoing the alcohol measurement using the alcohol measurement device and for taking pictures of the driver of the vehicle;
   a testee image pick-up means for picking up a face image of the testee from the camera shot during the alcohol measurement using the alcohol measurement device;
   a driver image pick-up means for picking up a face image of the driver of the vehicle from the camera shot within a predetermined period of time before or after the alcohol measurement; and
   a checking means for checking the testee and the driver based on the face images of the testee and the driver,
   wherein the alcohol measurement device displays a predetermined change in an appearance thereof during the alcohol measurement, the appearance change being shot together with the face of the testee, and
   wherein the detecting device further comprises a measurement judging means for judging whether the alcohol measurement is performed properly based on the appearance change of the alcohol measurement device appearing in the face image of the testee,
   wherein the detecting system further comprises:
      a seat-leaving monitoring means for monitoring whether the driver leaves the driver's seat of the vehicle; and
      a vehicle control means for limiting driving the vehicle when it is judged that the testee and the driver do not coincide or the driver left the driver's seat of the vehicle, and releasing driving the vehicle when it is judged that the testee and the driver coincide and the measured BAC is below a certain level.

* * * * *